United States Patent
McKee

(10) Patent No.: US 11,364,969 B1
(45) Date of Patent: Jun. 21, 2022

(54) BICYCLE PEDAL

(71) Applicant: Andrew McKee, Durango, CO (US)

(72) Inventor: Andrew McKee, Durango, CO (US)

(*) Notice: Subject to any disclaimer, the term of this patent is extended or adjusted under 35 U.S.C. 154(b) by 0 days.

(21) Appl. No.: 17/220,758

(22) Filed: Apr. 1, 2021

(51) Int. Cl.
*B62M 3/08* (2006.01)

(52) U.S. Cl.
CPC .................................. *B62M 3/086* (2013.01)

(58) Field of Classification Search
CPC ... B62M 3/08; B62M 3/086; Y10T 74/20888; Y10T 74/2168
USPC ....................................................... 74/594.4
See application file for complete search history.

(56) References Cited

U.S. PATENT DOCUMENTS

| | | | | |
|---|---|---|---|---|
| 5,992,266 | A * | 11/1999 | Heim ...................... | B62M 3/086 74/594.4 |
| 7,946,193 | B2 * | 5/2011 | Smith ...................... | G05G 1/60 74/564 |
| 8,714,052 | B2 * | 5/2014 | Chamberlain ........... | B62M 3/08 74/594.4 |
| 2006/0236809 | A1 * | 10/2006 | Bryne .................... | B62M 3/086 74/594.6 |
| 2009/0078081 | A1 * | 3/2009 | French .................... | B62M 3/08 74/594.4 |
| 2009/0095122 | A1 * | 4/2009 | Weagle .................... | B62M 3/08 74/560 |
| 2011/0048167 | A1 * | 3/2011 | Chen ........................ | A43B 5/14 74/594.6 |
| 2011/0088508 | A1 * | 4/2011 | Chen ...................... | B62M 3/086 74/594.6 |
| 2011/0302811 | A1 * | 12/2011 | Chang ...................... | A43B 5/14 36/131 |
| 2012/0291590 | A1 * | 11/2012 | Chamberlain ........... | B62M 3/08 74/594.6 |

FOREIGN PATENT DOCUMENTS

| | | | | |
|---|---|---|---|---|
| CN | 2808718 Y | * | 8/2006 | ............. B62M 3/08 |
| CN | 2808718 Y | * | 8/2006 | ............. B62M 3/08 |
| CN | 206802054 U | * | 12/2017 | ............. B62M 3/08 |
| CN | 108189954 A | * | 6/2018 | ............. B62M 3/08 |
| FR | 2809078 A1 | * | 11/2001 | ............. B62M 3/08 |

OTHER PUBLICATIONS

Traction, merriam-webster.com, Aug. 26, 2021 (Year: 2021).*
Pin, merriam-webster.com, Aug. 26, 2021 (Year: 2021).*
Detent, merriam-webster.com, Aug. 26, 2021 (Year: 2021).*
EPO Bibliographic data of CN 108189954 (A), Chen Zhongyi, Jun. 2018 (Year: 2018).*
EPO machine translation of FR 2809078 (A1), Henri, Nov. 23, 2001 (Year: 2001).*

* cited by examiner

*Primary Examiner* — Vinh Luong
(74) *Attorney, Agent, or Firm* — Bradley Fox

(57) ABSTRACT

A pedal comprises a spindle, a pedal body, and traction pins located in the pedal body. The pedal body rotates around the spindle. The pedal body has two surfaces configured to receive a shoe. Traction pins pass through openings in the pedal body and extend beyond the surface of the pedal body to form a platform for the rider's shoe. The heads of the traction pins are shaped to help secure the rider's shoe on the pedal. The traction pins are secured in the pedal body by fasteners that interact with the traction pins via holes positioned perpendicular to the traction pin openings.

4 Claims, 5 Drawing Sheets

BICYCLE PEDAL

FIELD OF THE INVENTION

This invention relates to bicycle pedals and specifically a platform pedal with traction pins retained in the pedal body to improve retention between a rider's foot and the pedal.

BACKGROUND ART

Bicycles generally use pedals to drive a wheel and provide power. Often a rear wheel of a bicycle is supported near a rearward end of a frame, a crank assembly is rotatably supported by a lower portion of the frame and a drive chain or belt extends between the crank assembly and the rear wheel to transfer power. The pedals are connected to the crank assembly, and the rider transfers power to the bicycle through the pedals.

Pedal designs include basic pedals and pedals with a variety of methods for affixing a rider's shoes to the pedal. Basic pedal designs range from pedals designed to be used for casual riding to more specialized pedals that may include aggressive traction pins to be used for off-road riding, downhill riding, and racing. These off-road pedals that may include traction pins are often called "platform" pedals.

One drawback with current pedal designs with traction pins is that the retention of traction pins limits the design of the pedal. Retaining the traction pins in the pedal body often drives the design of the pedal body itself and the materials used to manufacture the pedal body. Typically, existing pedals with traction pins require the pedal body to act as the treaded fastener for the traction pin, and threads are cut into the pedal body and traction pins such that the traction pin itself is threaded into the pedal body. This requires the pedal body material to be strong enough to retain the traction pin in place in all kinds of environmental conditions. Further if the traction pin threads or the pedal body threads are damaged, the pedal is rendered less useful. Thus, in prior designs, the strength of the thread in the pedal body and along the traction pins are of utmost importance to the function of the pedal; therefore, limiting both the materials that can be used for the pedal body and traction pins and the overall design and location of the body and pins. What is needed is an improved design to retain traction pins that permits greater design freedom for the design of the pedal.

SUMMARY OF THE INVENTION

The current invention relates to a new pedal design that includes traction pins for use on bicycles and other vehicles. The pedal comprises a spindle, a pedal body, and traction pins secured in the pedal body by fasteners. The traction pins and pedal body form a platform to support and secure a rider's shoe to the pedal.

The pedal body rotates around the spindle. The pedal body has two surfaces configured to receive a shoe. The rider's shoe typically is on the surface of the pedal that is facing upward. Traction pins pass through openings in the pedal body with the heads of the traction pins protruding from the pedal body to form a secure platform for the rider's shoe. The heads of the traction pins are shaped to aid in securing the rider's shoe on the pedal. The traction pins are secured in the pedal body by fasteners that interact with the traction pins via holes positioned perpendicular to the traction pins. Typically, the fasteners pass through the pedal body and mate with a threaded opening in the traction pins to fix the traction pins in place. This design affords greater flexibility in the design of the pedal body and choice of materials used for the pedal body while still providing positive retention of the traction pins. For example, lighter weight pedal body designs with lighter weight composite materials can be used to manufacture the pedal body while still confidently fixing the traction pins to the pedal. The present invention eliminates the need to thread the traction pin directly into the pedal body, which allows for greater freedom in the choice of the materials that can be used for the pedal body and traction pins and the overall design and location of the body and pins.

The traction pins may extend beyond one or both surfaces of the pedal body. The opposite surface may have another method of securing the rider's shoe to the pedal. This has the potential to reduce the number of required traction pin components by one half, as they are dual-sided.

BRIEF DESCRIPTION OF THE DRAWINGS

Embodiments of the present invention are illustrated by way of examples and are not limited to the accompanying drawings.

DETAILED DESCRIPTION OF INVENTION

Figure 1:
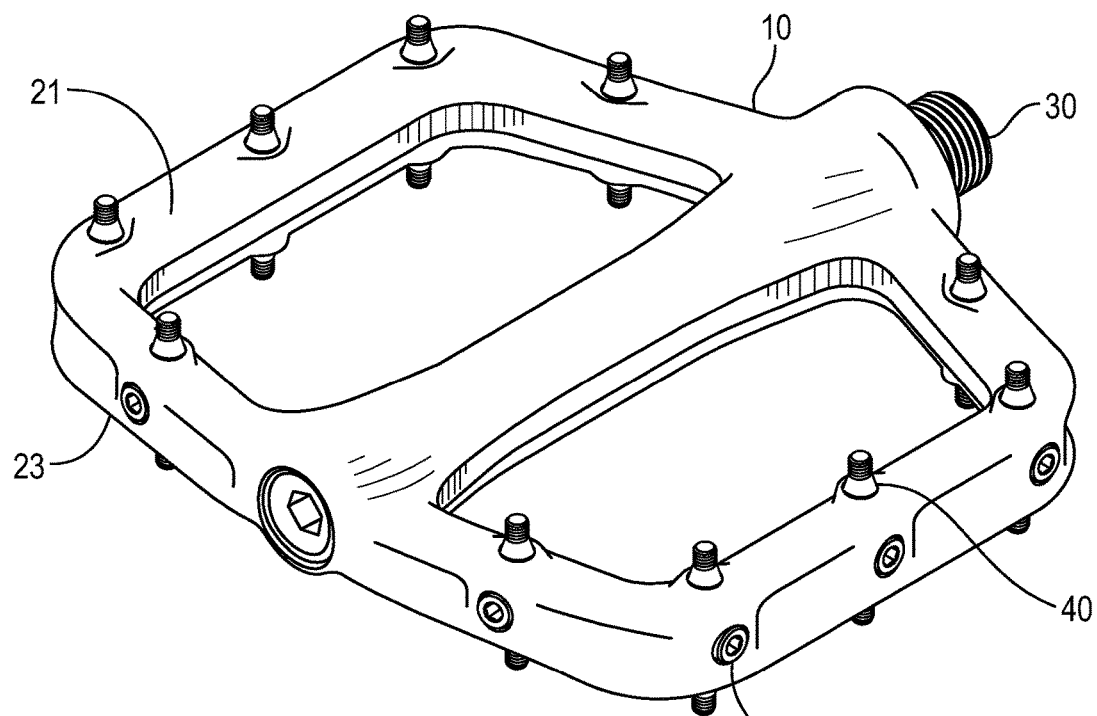
FIG. 1 shows a perspective view of an embodiment of the bicycle pedal.

Referring now to the figures, A pedal 10 includes a pedal body 20 that rotates around a spindle 30. The pedal body 20 has two surfaces 21, 23, and the rider can place a shoe 5 on either surface that is facing up. The pedal body 20 contains a plurality of traction pins 40 that pass through a plurality of openings 42 in the pedal body 20. The traction pins 40 are secured to the pedal body 20 by way of fasteners 60 that enter the pedal body 20 through holes 62 positioned perpendicular to the traction pins 40. The fasteners 60 interact with the traction pins 40 by way of a threaded opening 46 and fix the traction pins in place. The threaded end portions 48 located at the distal end of the traction pins 49 and the surfaces of the pedal body 21, 23 form a secure platform for a rider's shoe 5.

Figure 2:
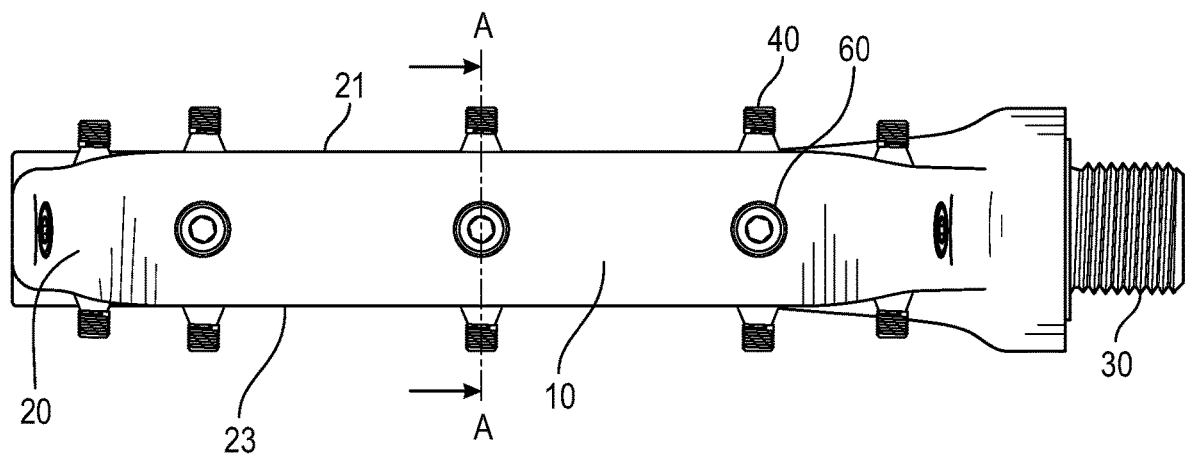
FIG. 2 is a side view of an embodiment of the bicycle pedal.
Figure 3:
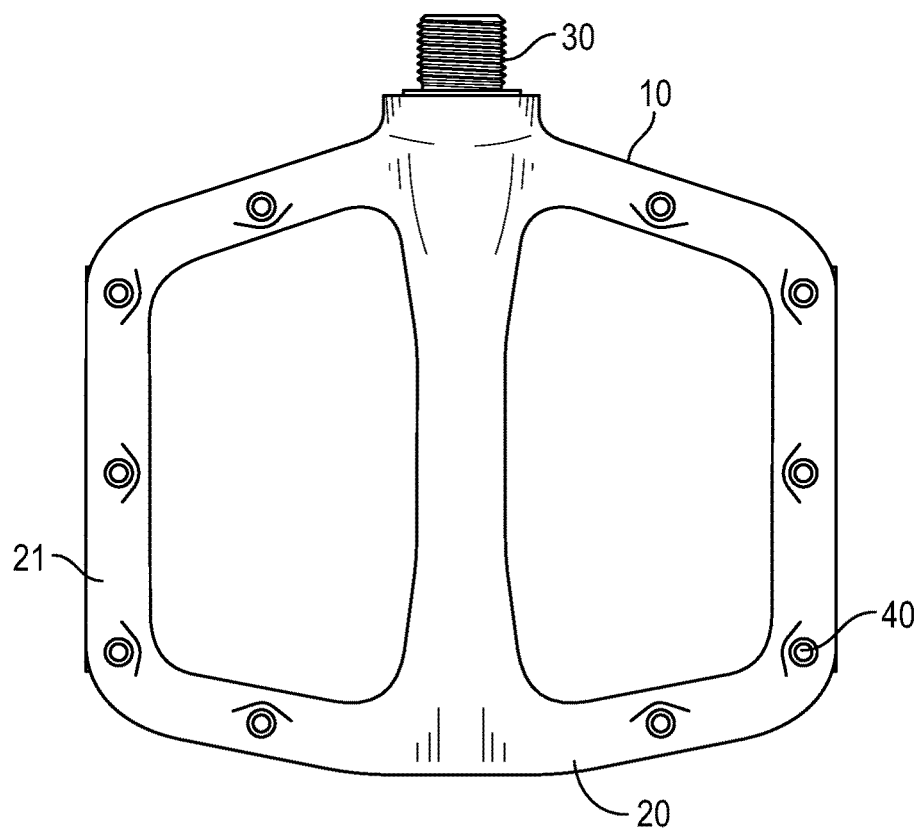
FIG. 3 is a top view of an embodiment of the bicycle pedal.

The pedal 10 may have traction pins 40 protruding beyond one surface 21 of the pedal body 20 or both surfaces 21, 23. In one embodiment, the pedal 10 can have traction pins 40 extending from one surface 21 of the body 20 forming a single platform. In such configuration, another means of securing a rider's shoe 5 to the pedal can be located on the opposite side of the pedal. In another embodiment, the traction pins 40 may extend beyond both surfaces 21, 23 of the body and form secure platforms on both sides of the pedal as shown in FIG. 2. This means the rider is able to place a foot on whichever of the two surfaces 21, 23 of the pedal that is facing upwards.

The pedal body 20 may be constructed from any material sufficient to withstand the forces the rider places upon the pedal and forces from impact. In one embodiment of the pedal 10, the pedal body 20 is formed from a composite material. This material provides a weight savings over metal pedal bodies and can also be designed in many desirable configurations.

Figure 4:
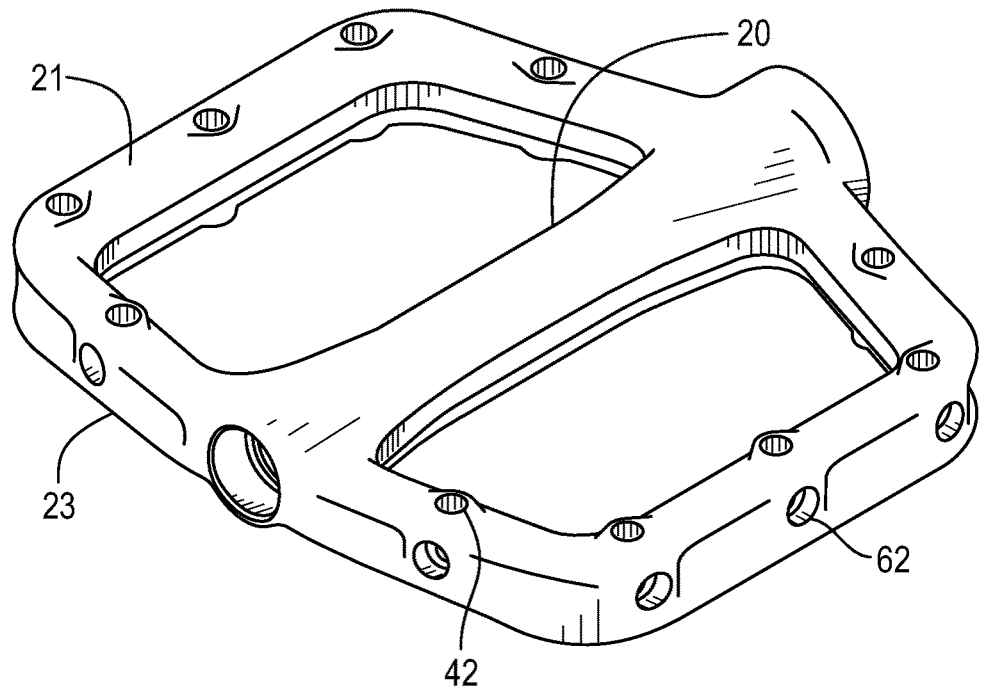
FIG. 4 is a perspective view of an embodiment of the bicycle pedal body.
Figure 5A:
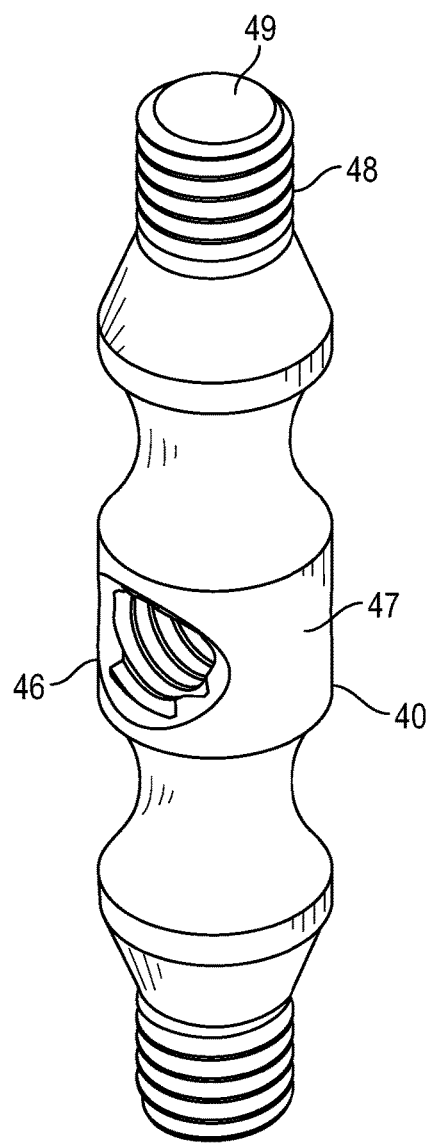
FIG. 5a is an embodiment of the traction pin of the current invention.
Figure 5B:
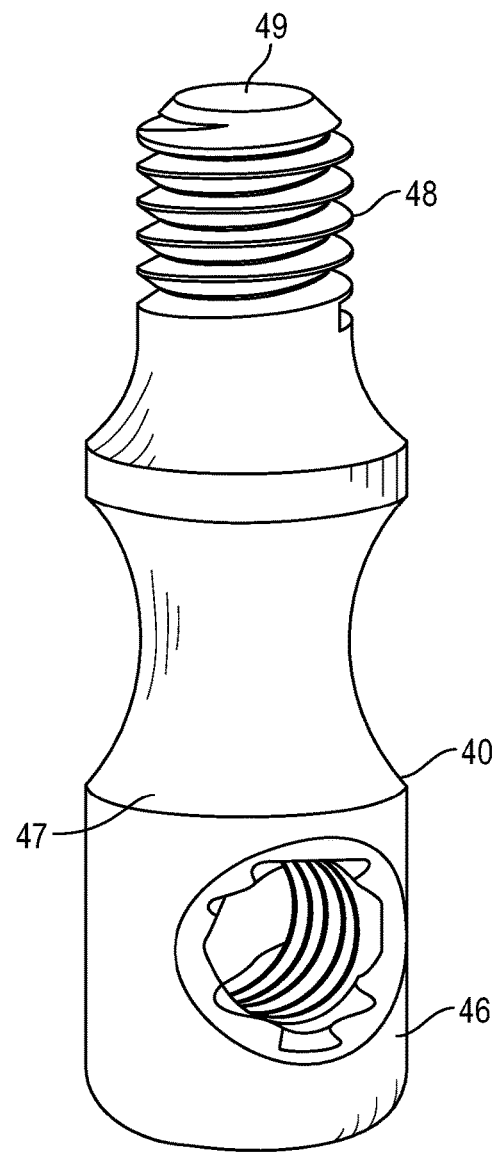
FIG. 5b is an alternative embodiment of the traction pin of the current invention.

In an embodiment of the pedal 10 shown in FIG. 4, the pedal body 20 has a plurality of openings 42 passing through the body 20. The openings are spaced around the pedal body 20 in desired locations. The openings are sized to accommodate the traction pins 40. In an alternative embodiment, the openings 42 do not pass fully through the pedal body 20, and the traction pins 40 are only protruding from one surface of the pedal 10. Such a traction pin design is shown in FIG. 5b.

The traction pins 40 are arranged in the openings 42 and secured in place by fasteners 60. The fasteners 60 are inserted into fastener holes 62 around the outer periphery of the pedal body 20. The fastener holes 62 are positioned perpendicular to the openings 42. This permits the fasteners to interact with the traction pins 40 and secure them in place.

Figure 5C:
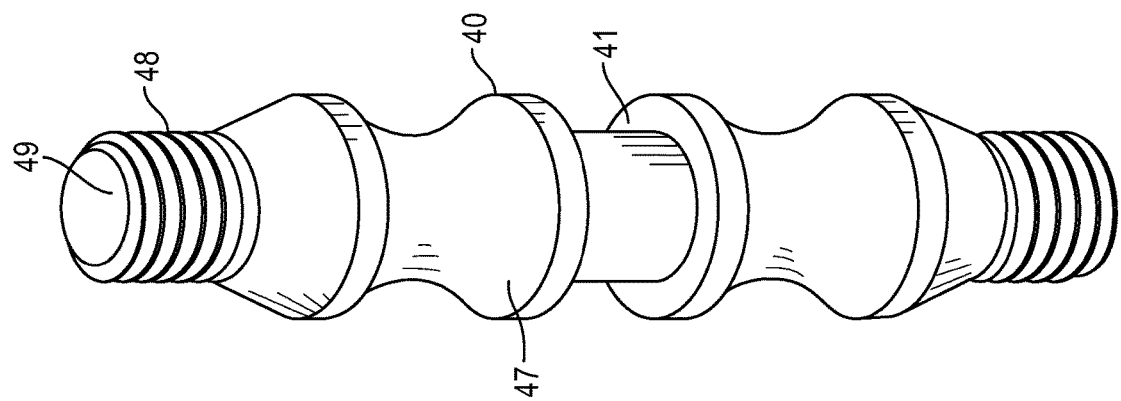
FIG. 5c is another alternative embodiment of the traction pin of the current invention.

In one embodiment, the fastener holes 62 allow the fasteners 60 to pass through the pedal body allowing the fasteners 60 to thread into the traction pins 40 to secure them in place by interacting with the threaded opening 46. In another embodiment, the fastener holes 62 in the pedal body 20 are threaded. The fasteners 60 are threaded into the fastener holes 62 and, when fully tightened into the holes 62, the fasteners 60 thread into the traction pins 40 to secure them in place by interacting with the threaded opening 46. In an alternative embodiment, the fasteners 60 may be press fit in place and secure the traction pins in the pedal body by interacting with detent 41 in the traction pin 40 as shown in FIG. 5c. In such an embodiment, an adhesive may be utilized to secure the fasteners in the holes 62 of the pedal body 20.

The fasteners 60 may interact with the traction pins 40 in several ways. The fasteners 60 may thread into the traction pins 40 by interacting with the threaded opening 46 in the traction pin 40. The fasteners 60 may be pressed into the pedal body applying a force against the traction pins 40 via a detent 41 that retains the tractions pins 40 by increased friction between the traction pins 40 and the openings 42 in addition to the friction between the traction pins 40 and the fasteners 60. The fastener openings 62 may be threaded such that the fasteners 60 are treaded into the pedal body and interact with the threaded hole 46. The fastener openings 62 may be threaded such that the fasteners 60 are treaded into the pedal body and interact with the detent 41 or an unthreaded opening in the traction pins. It will be understood that other similar methods may be employed to fix the traction pin 40 in place using interaction with the fasteners 60.

Figure 6:
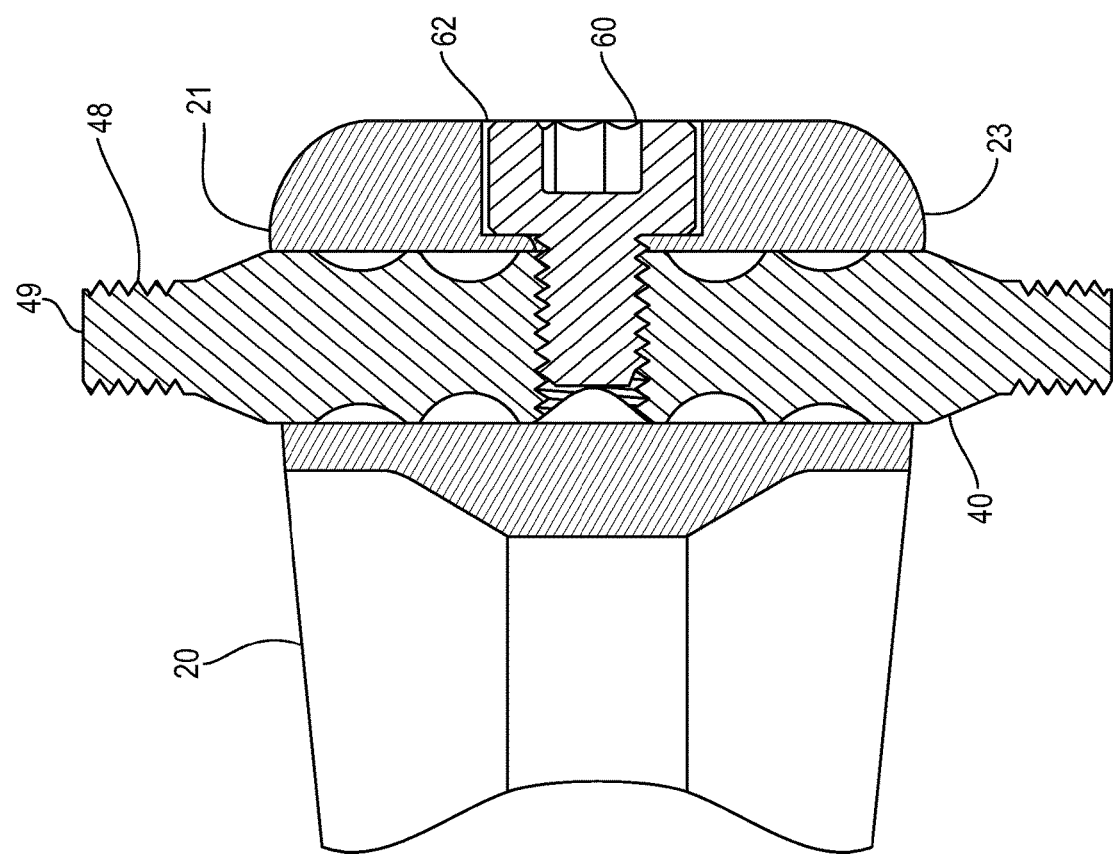
FIG. 6 is a cross section view of the bicycle pedal in FIG. 2 along section line A-A further showing a fastener, a traction pin, and pedal body with the traction pin secured in the pedal body.
Figure 7:
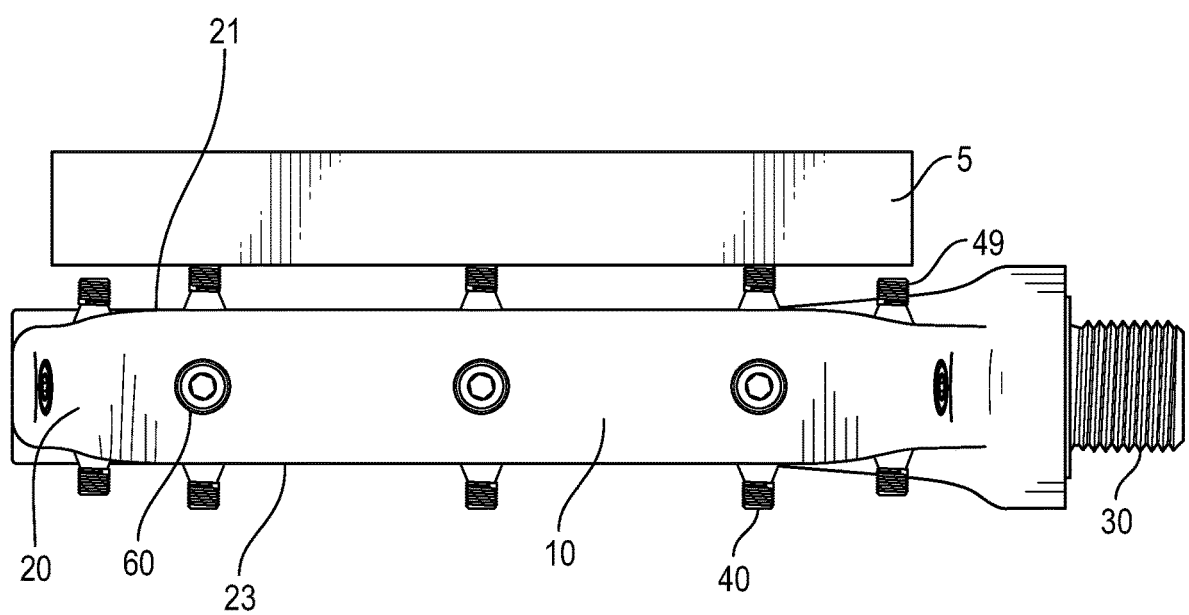
FIG. 7 is a side view of an embodiment of the bicycle pedal showing a portion of a bicycle rider's shoe engaging the heads of the traction pins

In one embodiment shown in FIG. 6, the traction pins 40 have a threaded portion 48 and a head 49 on either end of the traction pin 40. The traction pins 40 also have a base portion 47 located within pedal body 20 as shown for example in FIG. 6. The head 49 is shaped to provide greater friction between the rider's shoe 5 and the pedal 10. As shown in FIG. 6, the traction pin 40 has an opening 46 relatively centrally located. The opening 46 is generally located in the base portion 47 of the traction pin 40. The openings 46 of the traction pins 40 are configured to interact with the fasteners 60 and secure the traction pins 40 in place. The fasteners 60 thread into the opening 46. In an alternative embodiment shown in FIG. 5c, the traction pins 40 has a detent 41. In these embodiments the fasteners 60 thread into the pedal body 20 and press against the traction pins 40 and secure the pins in place.

It will be appreciated by those skilled in the art that the present invention is not limited to any particular the arrangement described above. It should also be appreciated that the pedal design can be used on e-bikes and other vehicles that use pedals.

What is claimed is:

1. A platform pedal comprising:
   a spindle;
   a body constructed from composite material rotatably coupled to the spindle;
   a plurality of cylindrical traction pins positioned in a plurality of openings in the body, the traction pins having a base portion located within the body and a head protruding from a surface of the body to form a platform atop the traction pins; and
   a plurality of fasteners extending through a plurality of holes in the body positioned perpendicular to the traction pins, wherein the ends of the fasteners are threaded and the fasteners thread into holes in the base portion of the traction pins and secure the traction pins in the body.

2. A platform pedal comprising:
   a spindle;
   a body rotatably coupled to the spindle;
   a plurality of cylindrical traction pins positioned in a plurality of openings in the body, the traction pins having a base portion located within the body and a head protruding from a surface of the body to form a platform atop the traction pins;
   a plurality of fasteners extending through a plurality of holes in the body positioned perpendicular to the traction pins, wherein the fasteners are threaded and screwed into a threaded opening in the traction pin base portion and secure the traction pins in the body; and
   wherein the heads of the traction pins engage a bicycle rider's shoe to provide greater friction between the bicycle rider's shoe and the pedal without retaining the shoe to the pedal.

3. The pedal of claim 2 wherein the body is formed from a composite material.

4. A platform pedal comprising:
   a spindle;
   a body rotatably coupled to the spindle;
   a plurality of cylindrical traction pins positioned in a plurality of openings in the body, the traction pins having a base portion located within the body and a head protruding from a surface of the body to form a platform atop the traction pins;
   a plurality of fasteners extending through a plurality of holes in the body positioned perpendicular to the traction pins, wherein the plurality of holes in the body positioned perpendicular to the traction pins are threaded and the fasteners thread into the body and interact with an opening in the base portion the traction pins; and wherein the heads of the traction pins engage a bicycle rider's shoe to provide greater friction between the bicycle rider's shoe and the pedal without retaining the shoe to the pedal.

* * * * *